(12) United States Patent
Sugimoto et al.

(10) Patent No.: US 8,365,809 B2
(45) Date of Patent: Feb. 5, 2013

(54) INTEGRATED HEAT EXCHANGER AND HEAT EXCHANGER

(75) Inventors: Naoki Sugimoto, Anjo (JP); Kaoru Tsuzuki, Ichinomiya (JP)

(73) Assignee: Denso Corporation, Kariya (JP)

( * ) Notice: Subject to any disclaimer, the term of this patent is extended or adjusted under 35 U.S.C. 154(b) by 1324 days.

(21) Appl. No.: 11/642,765

(22) Filed: Dec. 20, 2006

(65) Prior Publication Data

US 2007/0144713 A1  Jun. 28, 2007

(30) Foreign Application Priority Data

Dec. 26, 2005  (JP) ................................ 2005-372302

(51) Int. Cl.
*F28F 9/007* (2006.01)
(52) U.S. Cl. .......... 165/67; 165/132; 165/140; 180/68.4
(58) Field of Classification Search .................. 165/140, 165/67, 132; 180/68.4
See application file for complete search history.

(56) References Cited

U.S. PATENT DOCUMENTS

| | | | | |
|---|---|---|---|---|
| 2,505,790 | A | * | 5/1950 | Panthofer ...................... 165/140 |
| 5,197,538 | A | * | 3/1993 | Nagasaka et al. .............. 165/144 |
| 5,269,367 | A | * | 12/1993 | Susa et al. ...................... 165/140 |
| 5,896,754 | A | * | 4/1999 | Balthazard et al. ........... 165/132 |
| 5,946,940 | A | * | 9/1999 | Inoue ............................. 165/132 |
| 6,029,345 | A | * | 2/2000 | Christensen .................. 165/140 |
| 6,158,500 | A | * | 12/2000 | Heine ............................... 165/67 |
| 6,318,454 | B1 | * | 11/2001 | Schule et al. .................. 165/140 |
| 6,789,613 | B1 | | 9/2004 | Ozaki et al. |
| 6,827,129 | B2 | * | 12/2004 | Ozawa et al. .................... 165/67 |
| 6,851,468 | B2 | * | 2/2005 | Kaspar et al. .................. 165/132 |
| 6,907,916 | B2 | * | 6/2005 | Koyama ........................... 165/67 |
| 2003/0085027 | A1 | * | 5/2003 | Koyama ......................... 165/140 |
| 2005/0217832 | A1 | | 10/2005 | Sanada et al. |
| 2005/0274507 | A1 | | 12/2005 | Sanada et al. |
| 2006/0060327 | A1 | * | 3/2006 | Yu et al. ......................... 165/132 |

FOREIGN PATENT DOCUMENTS

| | | |
|---|---|---|
| CN | 2663901 | 12/2004 |
| JP | 2000-146481 | 5/2000 |
| JP | 2000-193393 | 7/2000 |

OTHER PUBLICATIONS

Office Action dated Jun. 20, 2008 in Chinese Application No. 2006 10165976.X with English translation.
Office Action dated Dec. 21, 2010, in corresponding Japanese Application No. 2005-372302, and English translation thereof.

* cited by examiner

*Primary Examiner* — Leonard R Leo
(74) *Attorney, Agent, or Firm* — Harness, Dickey & Pierce, PLC (57) ABSTRACT

An integrated heat exchanger has a first heat exchanger and a second heat exchanger. The first heat exchanger has a first bracket and a second bracket on header parts thereof, respectively. The first bracket and the second bracket are connected to header parts of the second heat exchanger with a first bolt and a second bolt, respectively, for integrating the first heat exchanger with the second heat exchanger. The header parts of the second heat exchanger are provided with a first bolt-receiving portion and a second bolt-receiving portions for receiving the first bolt and the second bolt therein, respectively. The first bolt-receiving portion and the second bolt-receiving portion define a first axis and a second axis, respectively. The first axis and the second axis are nonparallel to each other. Thus, the first bolt and the second bolt are disposed nonparallel to each other.

24 Claims, 6 Drawing Sheets

INTEGRATED HEAT EXCHANGER AND HEAT EXCHANGER

CROSS REFERENCE TO RELATED APPLICATION

This application is based on Japanese Patent Application No. 2005-372302 filed on Dec. 26, 2005, the disclosure of which is incorporated herein by reference.

FIELD OF THE INVENTION

The present invention relates to an integrated heat exchanger in which plural heat exchangers are integrated and a heat exchanger to be mounted to an object.

BACKGROUND OF THE INVENTION

An integrated heat exchanger in which plural heat exchangers are integrated is for example known in Japanese Patent Publication No. 2005-156067 (US 2005/0217832A1). In the integrated heat exchanger, a condenser for condensing refrigerant for a vehicle air conditioner and a radiator for cooling a cooling water of an electric motor for traveling are connected such that heat exchanging parts of the condenser and the radiator are disposed on the same plane and in parallel with respect to a flow direction of air.

Further, each of the condenser and the radiator has side plates for reinforcing the heat exchanging part. The condenser and the radiator are integrated by connecting the side plates thereof with bolts and nuts.

Specifically, each side plate has a longitudinal contact wall to contact with an outermost side of the heat exchanging part and bracket fixing walls extending from the contact wall. Thus, the side plate has a generally U-shaped cross-section. The side plates are disposed to the heat exchanging parts such that the contact walls contact the outermost sides of the heat exchanging parts and the bracket fixing walls extend in directions separating from the heat exchanging parts. The bracket fixing walls of the side plates of the condenser and the radiator are arranged to overlap each other and fixed by the bolts and nuts. Accordingly, the condenser and the radiator are connected to each other through the side plates without using separate brackets and the like.

In the above integrated heat exchanger, the bolts extend through the overlapped bracket fixing walls in a direction perpendicular to the heat exchanging parts. In this case, if the integrated heat exchanger is subjected to vibrations in the direction perpendicular to the heat exchanging parts, the bolts and nuts are likely to be deformed and become loose. Namely, when the direction of the vibrations coincides with the axis of the bolts, loads caused by the vibrations are necessarily received only by bearing surfaces of the bolts and nuts. As a result, the bearing surfaces will be easily deformed, loosening the bolts. Accordingly, it is difficult to maintain the fixing condition between the condenser and the radiator.

SUMMARY OF THE INVENTION

The present invention is made in view of the foregoing matter, and it is an object of the present invention to provide an integrated heat exchanger in which plural heat exchangers are securely connected.

It is another object of the present invention to provide a heat exchanger capable of being securely connected to an object.

According to a first aspect of the present invention, the integrated heat exchanger has a first heat exchanger and a second heat exchanger integrated with each other. The first heat exchanger has a first heat exchanging part and a pair of first header parts. The first heat exchanging part includes a plurality of first tubes through which a first fluid flows. The pair of first header parts are disposed at ends of the first tubes and in communication with the first tubes. The second heat exchanger has a second heat exchanging part and a pair of second header parts. The second heat exchanging part includes a plurality of second tubes through which a second fluid flows. The pair of second header parts are disposed at ends of the second tubes and in communication with the second tubes. The first and second heat exchangers are disposed in parallel to each other with respect to a flow of a third fluid that flows outside of the first and second heat exchangers. The integrated heat exchanger further has a first bracket disposed to one of the first header parts, a second bracket disposed to the other of the first header parts, a first bolt-receiving portion disposed on one of the second header parts, and a second bolt-receiving portion disposed on the other of the second header parts. The first bolt-receiving portion defines at least one hole defining a first axis. The second bolt-receiving portion defines at least one hole defining a second axis. The first axis and the second axis are disposed nonparallel to each other. The first heat exchanger and the second heat exchanger are integrated such that a first bolt extends through the first bracket and is received in the first bolt-receiving portion, and a second bolt extends through the second bracket and is received in the hole of the second bolt-receiving portion.

In this construction, since the first axis of the first bolt-receiving portion and the second axis of the second bolt-receiving portion are disposed nonparallel to each other, a shaft portion of the first bolt and a shaft portion of the second bolt are nonparallel to each other. Therefore, even if the integrated heat exchanger is subjected to vibrations in a direction parallel to the shaft portion of the first bolt, vibration loads are received not only by a bearing surface of the first bolt but also the shaft portion of the second bolt. As such, deformation and loosening of the bearing surface of the first bolt are reduced.

Likewise, even if the integrated heat exchanger is subjected to vibrations in a direction parallel to the shaft portion of the second bolt, deformation and loosening of a bearing surface of the second bolt is reduced. Accordingly, the plural heat exchangers are securely connected without causing deformation and loosening of the bolts even when affected by the vibrations.

According a second aspect of the present invention, the heat exchanger has a heat exchanging part, a first header part and a second header part. The heat exchanging part has a plurality of tubes through which a fluid flows. The tubes have first ends and second ends. The first header part is disposed at the first ends of the tubes and in communication with the tubes. The second header part is disposed at the second ends of the tubes and in communication with the tubes. The heat exchanger further has a first bracket disposed to the first header part and a second bracket disposed to the second header part. The first bracket defines a first hole for allowing a first bolt to pass through. The first hole defines a first axis. The second bracket defines a second hole for allowing a second bolt to pass through. The second hole defines a second axis. The first bracket and the second bracket are disposed such that the first axis of the first hole and the second axis of the second hole are nonparallel relative to each other.

In this construction, when the heat exchanger is mounted to an object with the first and second bolts, a shaft portion of the first bolt and a shaft portion of the second bolt are disposed nonparallel to each other. Therefore, even if the heat exchanger is subjected to vibrations in a direction parallel to the shaft portion of the first bolt, vibration loads are received not only by a bearing surface of the first bolt but also the shaft portion of the second bolt. Accordingly, deformation and loosening of the bearing surface of the first bolt are reduced.

Likewise, even if the heat exchanger is subjected to vibrations in a direction parallel to the shaft portion of the second bolt, deformation and loosening of a bearing surface of the second bolt are reduced. As such, the heat exchanger can be securely mounted to the object without causing deformation and loosening of the bolts even when affected by vibrations.

According to a third aspect of the present invention, the heat exchanger has a heat exchanging part, a first header part and a second header part. The heat exchanging part has a plurality of tubes through which a fluid flows. The tubes have first ends and second ends. The first header part is coupled to the first ends of the tubes, and the second header part is coupled to the second ends of the tubes. The heat exchanger further has a first screwed hole portion disposed on the first header part for receiving a first bolt and a second screwed hole portion disposed on the second header part for receiving a second bolt. The first screwed hole portion defines a first axis, and the second screwed hole portion defines a second axis. The first axis and the second axis are nonparallel.

In this construction, shaft portions of the first and second bolts are disposed nonparallel to each other. Therefore, the heat exchanger can be securely connected to an object without causing deformation and loosening of the bolts.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
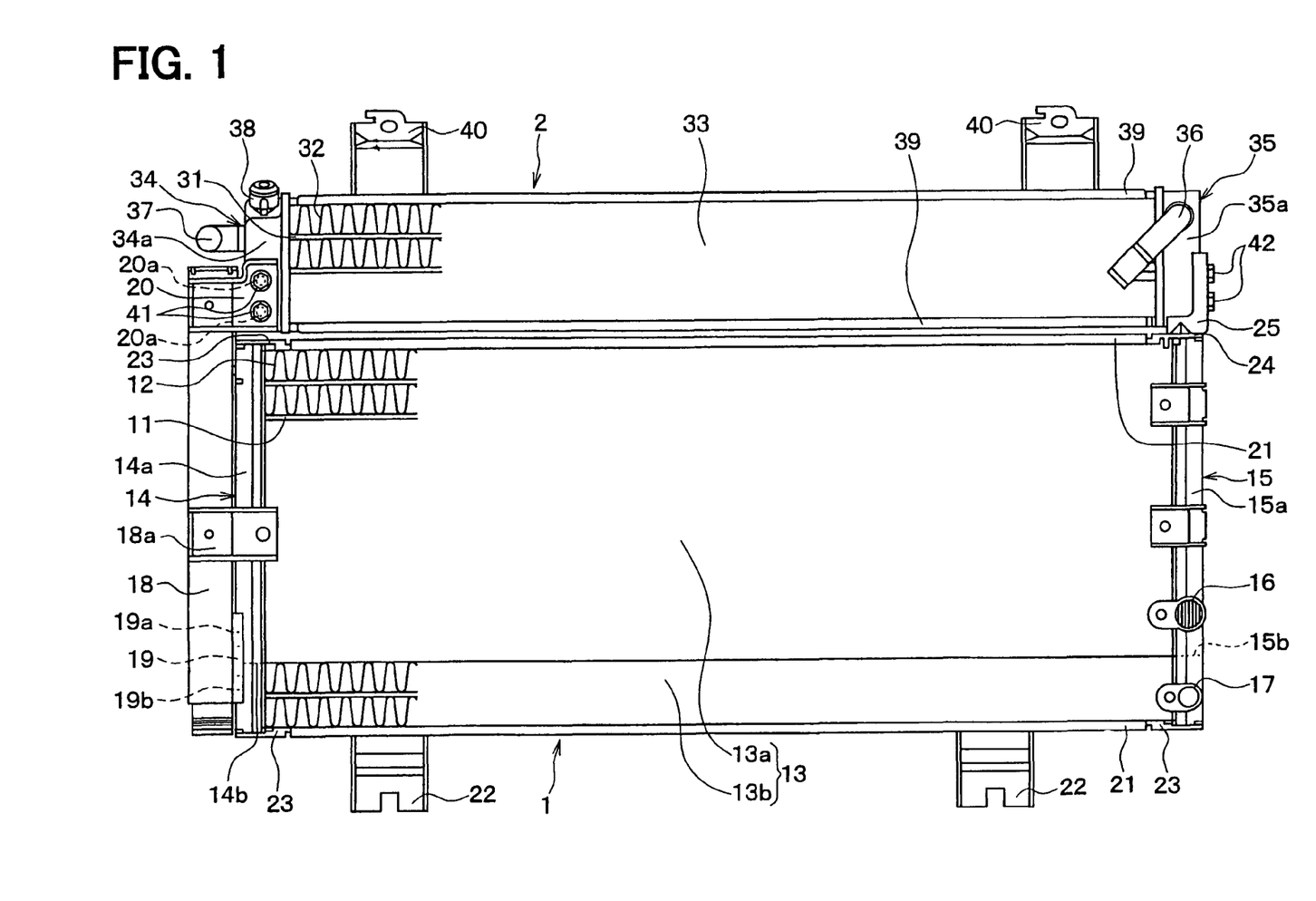
FIG. 1 is a schematic front view of an integrated heat exchanger according to a first embodiment of the present invention.

A first embodiment of the present invention will now be described with reference to FIGS. 1 to 4. As shown in FIG. 1, an integrated heat exchanger, which is for example used for a hybrid vehicle, has a condenser 1 as a first heat exchanger and an electric device cooling radiator 2 as a second heat exchanger. The condenser 1 and the electric device cooling radiator 2 are integrated with each other. The condenser 1 performs heat exchange between air and high temperature, high pressure refrigerant discharged from a compressor (not shown) of an air conditioner of the vehicle, thereby to condense the refrigerant. The electric device cooling radiator (hereafter, radiator) 2 is used for cooling electric devices (not shown) such as a generator, an inverter and an electric motor of the hybrid vehicle.

Figure 2:
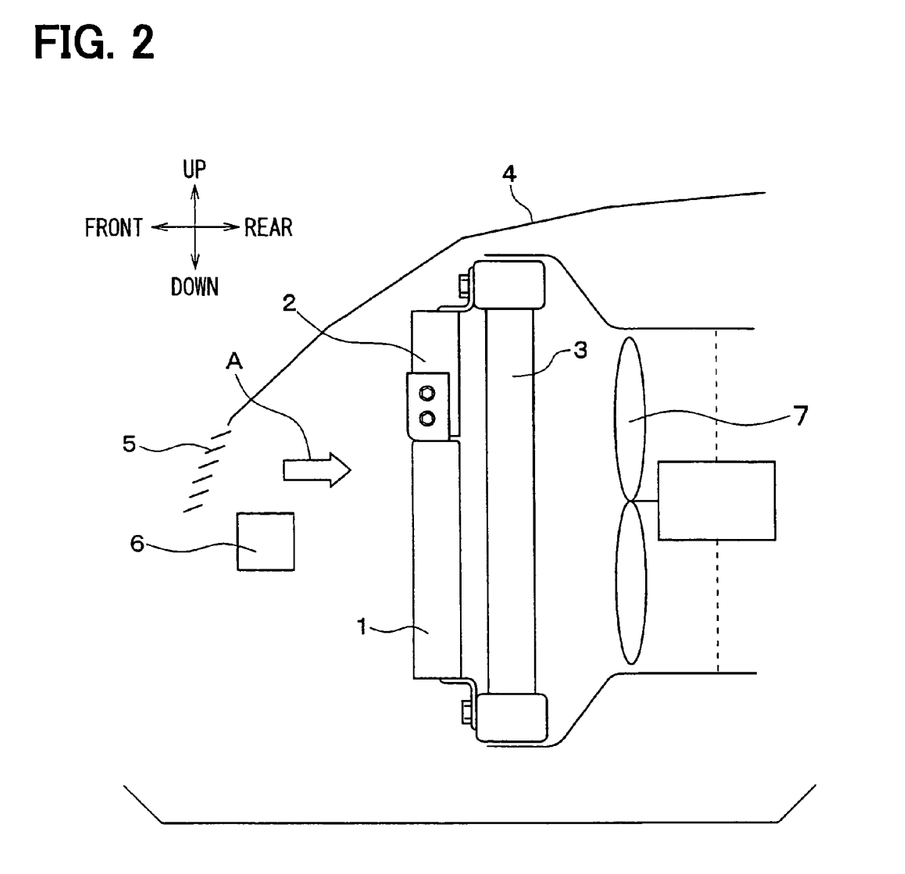
FIG. 2 is a schematic side view, of the integrated heat exchanger mounted to a vehicle according to the first embodiment.

The integrated heat exchanger is mounted in an engine compartment of the vehicle, as shown in FIG. 2. In FIG. 2, an up and down arrow and a front and rear arrow denote directions relating to the vehicle when the integrated heat exchanger is mounted on the vehicle. For example, the integrated heat exchanger is connected to an engine radiator 3 for an engine under a hood 4 and on a rear side of a radiator grill 5 and a bumper reinforcement member 6.

The condenser 1 and the radiator 2 are for example arranged on the generally same plane surface and in parallel with respect to a flow direction of air (arrow A in FIG. 2). Also, the radiator 2 is arranged above the condenser 1.

The integrated heat exchanger is arranged upstream of the engine radiator 3 with respect to the flow of air. The integrated heat exchanger overlaps the engine radiator 3 with respect to the air flow direction. An electric fan 7 is provided downstream of the engine radiator 3 with respect to the air flow direction to cause air to pass through the integrated heat exchanger.

Next, structures of the condenser 1 and the radiator 2 will be described. As shown in FIG. 1, the condenser 1 has a core part 13 as a first heat exchanging part and refrigerant header parts 14, 15 as first header parts. The core part 13 is constructed of a stack of refrigerant tubes 11 through which refrigerant flows and fins 12 for facilitating heat exchange between the refrigerant and air. The fins 12 are disposed between the adjacent refrigerant tubes 11. The core part 13 has a generally rectangular shape when viewed along the air flow direction.

The refrigerant header parts 14, 15 are arranged at longitudinal ends of the tubes 11 to make communication with the refrigerant tubes 11. The refrigerant header part 14 has a first refrigerant header tank 14a into which the refrigerant flowing through the tubes 11 is collected. The refrigerant header part 15 has a second refrigerant header tank 15a from which the refrigerant is distributed into the tubes 11.

Each of the refrigerant header tank 14a and the refrigerant header tank 15a is formed with slits (not shown). The number of the slits is equal to the number of the tubes 11. The ends of the first refrigerant header tank 14a and the second refrigerant header tank 15a are coupled to the slits so that the first refrigerant header tank 14a and the second refrigerant header tank 15a are in communication with the tubes 11.

The second refrigerant header tank 15a is provided with a refrigerant inlet pipe 16 for allowing the refrigerant to flow in the condenser 1 and a refrigerant outlet pipe 17 for discharging the refrigerant from the condenser 1. Further, a gas-liquid separator 18 is provided outside of the first refrigerant header tank 14a on a side opposite to the core part 13 with respect to the first refrigerant header tank 14a. The gas-liquid separator 18 separates the refrigerant into gas-phase refrigerant and liquid-phase refrigerant and stores the liquid-phase refrigerant therein. Thus, the gas-liquid separator 18 functions as a receiver.

The gas-liquid separator 18 is longer than the dimension of the core part 13 in a direction perpendicular to the tubes 11 so as to provide a sufficient gas-liquid separating space. Thus, the upper portion of the gas-liquid separator 18 projects upward from the upper end of the core part 13.

The gas-liquid separator 18 is connected to the first refrigerant header tank 14a through a fixing member 18a. Further, a plate member 19 is provided between the gas-liquid separator 18 and the first refrigerant header tank 14a. The plate member 19 is formed with two through holes 19a, 19b. The gas-liquid separator 18 is in communication with the first refrigerant header tank 14a through the two through holes 19a, 19b of the plate member 19. The first through hole 19a is located above the second through hole 19b.

The first refrigerant header tank 14a is provided with a first separator 14b. The first separator 14b is arranged at a lower location inside of the first refrigerant header tank 14a. Likewise, the second refrigerant header tank 15a is provided with a second separator 15b. The second separator 15b is arranged inside of the second refrigerant header tank 15a on the same level as the first separator 14b. Thus, the core part 13 is separated into two heat exchanging sections 13a, 13b by the first and second separators 14b, 15b.

The first heat exchanging section 13a of the core part 13, which is defined above the first and second separators 14a, 15b, performs heat exchange between air and the gas-phase refrigerant drawn from the refrigerant inlet pipe 16, thereby to condenses the refrigerant. Namely, the first heat exchanging section 13a provides a condensing section.

The refrigerant discharged from the condensing section 13a flows in the gas-liquid separator 18 through the first through hole 19a of the plate member 19. As such, the refrigerant inlet pipe 16 is arranged at a position higher than the second separator 15b, and the first through hole 19a is arranged at a position higher than the first separator 14b.

Further, the second heat exchanging section 13b of the core part 13, which is defined below the first and second separators 14b, 15b, performs heat exchange between air and the liquid-phase refrigerant that is introduced from the gas-liquid separator 18 through the second through hole 19b, thereby to cool the liquid-phase refrigerant. Namely, the second heat exchanging section 13b provides a super-cooling section.

The refrigerant cooled in the super-cooling section 13b is discharged from the refrigerant discharge pipe 17 defining a refrigerant discharge port. Accordingly, the refrigerant discharge pipe 17 is arranged at a position lower than the second separator 15b. Also, the second through hole 19b is arranged at a position lower than the first separator 14b.

As described above, the refrigerant header part 14 is constructed of the first refrigerant header tank 14a, the first separator 14b, the gas-liquid separator 18, the plate member 19, tank caps 23, and the like. The second refrigerant header part 15 is constructed of the second refrigerant header tank 15a, the second separator 15b, tanks caps 23, 24 and the like.

In the condenser 1, the super-cooling section 13b is defined under the condensing section 13a, and the gas-liquid separator 18 is disposed on the sides of the super-cooling section 13b and the condensing section 13a. Further, the gas-liquid separator 18 is disposed such that its upper portion projects upward from an upper end of the condensing section 13a. A first bracket 20 is provided to the upper portion of the gas-liquid separator 18, which is located higher than the upper end of the condensing section 13a, for connecting the condenser 1 to the radiator 2.

The first bracket 20 is formed with two through holes 20a for allowing shaft portions of bolts 41 to pass through. The two through holes 20a are arranged in the up and down direction. Each through hole 20a defines an axis extending in a direction perpendicular to a paper plane of FIG. 1, i.e., in a direction parallel to the front and rear direction of the vehicle. The axes of the through holes 20a coincide with axes of the shaft portions of the bolts 41.

The condenser 1 is further provided with side plates 21. The side plates 21 are arranged at both sides of the stack of refrigerant tubes 11 and extend parallel to the refrigerant tubes 11 for reinforcing the core part 13. Further, one of the side plates 21, which is arranged at a lower side of the core part 13, is provided with two brackets 22 for fixing the integrated heat exchanger to the engine radiator 3.

The first refrigerant header tank 14a and the second refrigerant header tank 15a are provided with the tank caps 23, 24. Specifically, an upper end and a lower end of the first refrigerant header tank 14a are covered with the tank caps 23. A lower end of the second refrigerant header tank 15a is also covered with the tank cap 23. An upper end of the second refrigerant header tank 15a is covered with the tank cap 24. Further, the tank cap 24 is provided with a second bracket 25 for connecting the condenser 1 and the radiator 2.

Figure 3A:
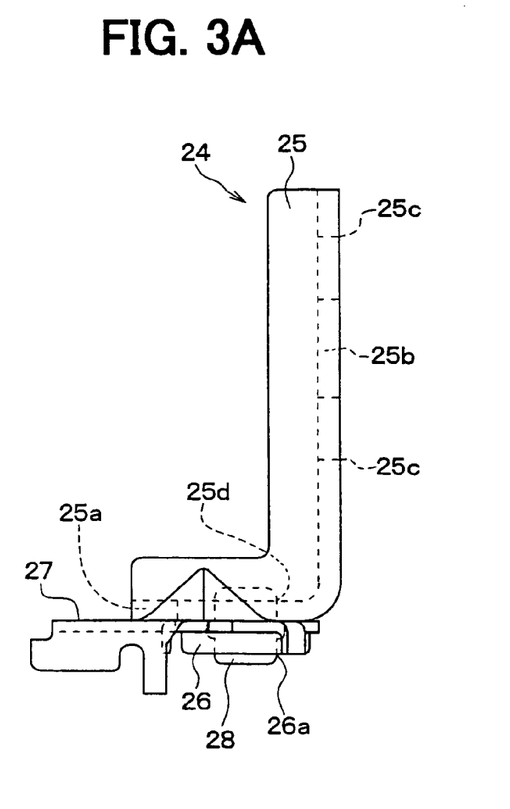
FIG. 3A is a front view of a tank cap with a second bracket of the integrated heat exchanger according to the first embodiment.
Figure 3B:
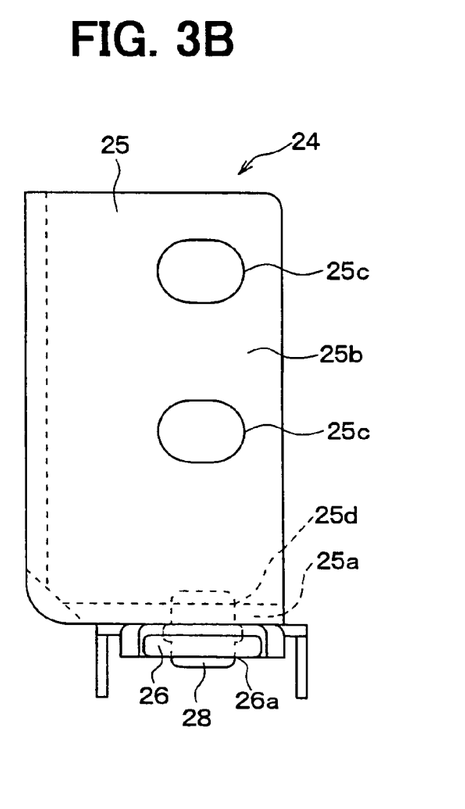
FIG. 3B is a side view of the tank cap with the second bracket according to the first embodiment.

As shown in FIGS. 3A and 3B, the tank cap 24 has the second bracket 25, a tank covering portion 26 and a cap extending portion 27. The tank covering portion 26 and the cap extending portion 27 are integrated as in the form of generally flat plate. The tank covering portion 26 covers the upper end of the second refrigerant header tank 15a. The cap extending portion 27 extends from the tank covering portion 26 and overlaps an upper surface of the upper side plate 21. The cap extending portion 27 is joined to the upper side plate 21.

Also, the second bracket 25 has a connecting wall portion 25a connected to the tank covering portion 26 and a fixing wall portion 25b to which the radiator 2 is fixed. The fixing wall portion 25b substantially perpendicularly extends from the connecting wall portion 25a. Thus, the second bracket 25 has a generally L-shape when viewed from the front side of the condenser 1, as shown in FIG. 3A.

The fixing wall potion 25b is formed with two through holes 25c for allowing shaft portions of bolts 42 to pass through. The through holes 25c are arranged in the up and down direction. Each through hole 25c defines an axis extending in the right and left direction in FIG. 1, i.e., in the right and left direction of the vehicle. The axes of the through hole 25c coincide with axes of the shaft portions of the bolts 42.

Further, the tank covering portion 26 is formed with a through hole 26a. The joining wall portion 25a is also formed with a through hole 25d. A pin 28 is provided to extend through the through hole 26a and the through hole 25d. Further, the pin 28 is fixed in the through hole 26a and the through hole 25d. For example, in a condition that the pin 28 is inserted through the through holes 25d, 26a, a load is applied to the pin 28 in a direction parallel to an axis of the pin 28. Thus, the pin 28 is deformed and fixed to the connecting wall portion 25a and the tank covering portion 26. Accordingly, the second bracket 25 and the tank covering portion 26 are connected to each other through the pin 28.

However, the second bracket 25 and the tank covering portion 26 can be connected by another means. Alternatively, the second bracket 25 and the tank covering portion 26 can be integrally produced from a single part such as by cutting.

In the example illustrated in FIGS. 1, 3A and 3B, the second bracket 25 is connected to the second refrigerant header tank 15a through the tank covering portion 26. Alternatively, the second bracket 25 can be directly connected to the second refrigerant header tank 15a.

The preceding parts constructing the condenser 1 are for example made of aluminum alloy and integrally joined by brazing and soldering.

Here, the brazing and soldering is a method of joining separate parts using a material such as a brazing material and a soldering without melting base materials of the separate parts, as defined in "setsuzoku and setsugo giyutsu" Tokyo Denki University Press, for example. Specifically, joining using a filler material (brazing material) having a melting point equal to or higher than 450 degrees Celsius is defined as brazing. Joining using a filler material (solder) having a melting point lower than 450 degrees Celsius is defined as soldering.

In the embodiment, the respective parts constructing the condenser 1 are integrated by the brazing, for example.

Figure 4:
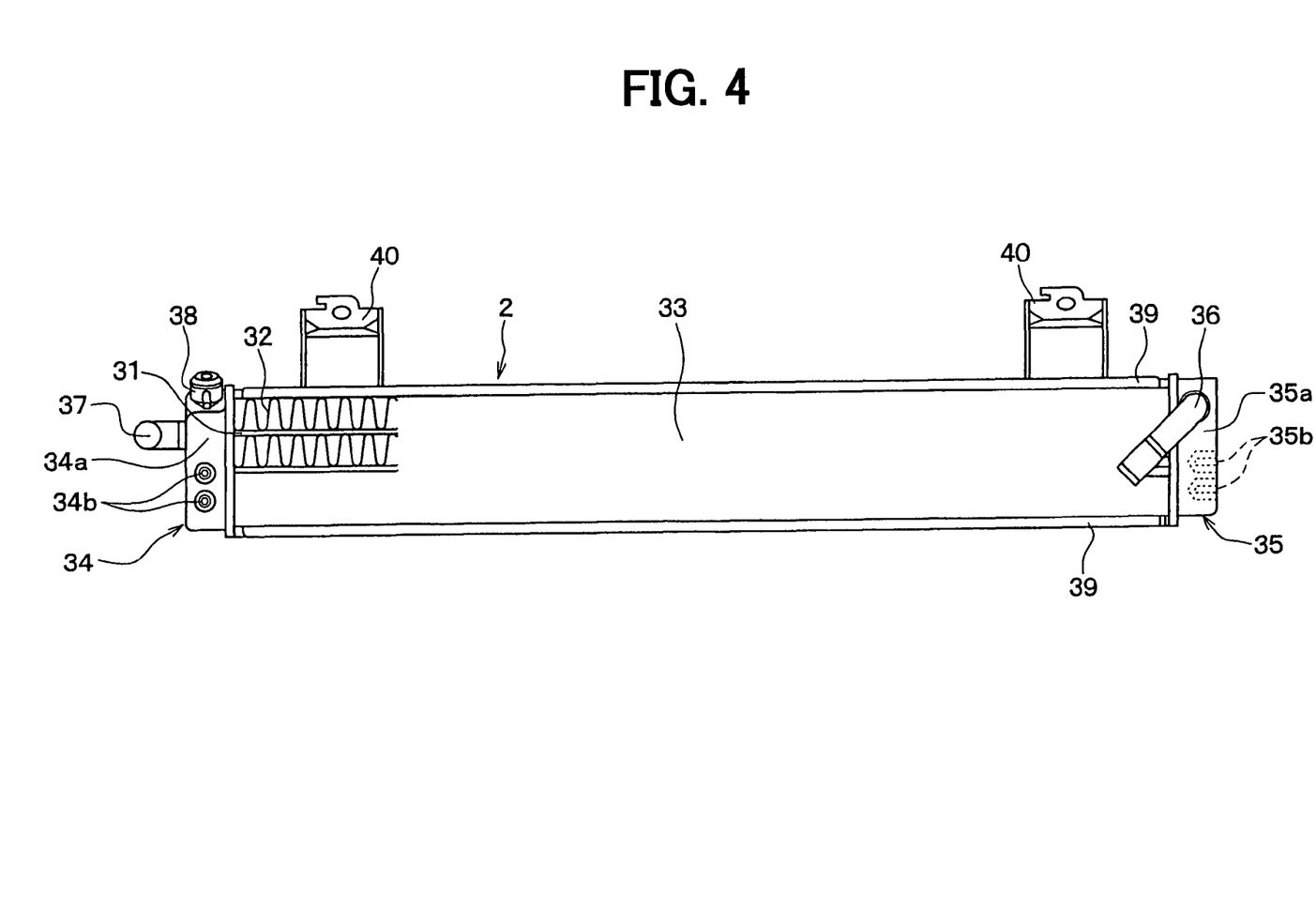
FIG. 4 is a schematic front view of a radiator of the integrated heat exchanger according to the first embodiment.

As shown in FIG. 4, the radiator 2 has a core part 33 as a second heat exchanging part and cooling water header part 34, 35 as second header parts. The core part 33 is constructed of a stack of cooling water tubes 31 through which the cooling water flows. Also, fins 32 for facilitating heat exchange between the cooling water and air are disposed between the adjacent cooling water tubes 31. The core part 33 has a generally rectangular shape when viewed from the front side.

The cooling water header parts 34, 35 are arranged at longitudinal ends of the cooling water tubes 31 to make communication with the cooling water tubes 31. The cooling water header parts 34 has a first cooling water header tank 34a into which the cooling water flowing through the cooling water tubes 31 is collected. The opposite cooling water header parts 35 has a second cooling water header tank 35a from which the cooling water is distributed into the cooling water tubes 31.

Each of the first cooling water header tank 34a and the second cooling water header tank 35a is formed with slits (not shown). The number of the slits is equal to the number of the cooling water tubes 11. The longitudinal ends of the cooling water tubes 11 are coupled to the slits, so the cooling water tubes 11 are in communication with the first cooling water header tank 34a and the second cooling water header tank 35a.

The second cooling water header tank 35a is provided with a cooling water inlet pipe 36 for allowing the cooling water to flow into the radiator 2. The first cooling water header tank 34a is provided with a cooling water outlet pipe 37 for discharging the cooling water 2 from the radiator 2 and an air bleeding valve 38 for bleeding air.

Further, the first cooling water header tank 34a is formed with first bolt-receiving portions 34b at its lower location for receiving the shaft portions of the bolts 41 for connecting the condenser 1 to the radiator 2. Specifically, two bolt-receiving portions 34b are formed at positions corresponding to the through holes 20a of the first bracket 20 of the gas-liquid separator 18. The first bolt-receiving portions 34b are arranged in the up and down direction. Also, the first bolt-receiving portions 34b define axes extending in a direction perpendicular to the longitudinal direction of the cooling water tubes 31, e.g., in the vehicle front and rear direction.

The first bolt-receiving portions 34b are for example formed of screwed holes portions. The screwed holes portions 34b are for example provided by embedded nuts. For example, through holes 20a are formed on the first cooling water header tank 34a at positions corresponding to the through holes 20a of the first bracket 20. Aluminum nuts, which have generally cylindrical shapes and inner walls thereof are screwed, are press-fitted into the through holes of the first cooling water header tank 34a. Further, the first cooling water header tank 34a and the embedded nuts are joined by brazing.

Likewise, the second cooling water header tank 35a is formed with second bolt-receiving portions 35b at its lower position for receiving the shaft portions of the bolts 42 for connecting the condenser 1 to the radiator 2. The second bolt-receiving portions 35b are arranged in the up and down direction at positions corresponding to the through holes 25c of the second bracket 25, which is connected to the second refrigerant header tank 15a of the condenser 1 through the tank cap 24.

The second bolt-receiving portions 35b are for example formed of screwed hole portions. The screwed hole portions 35b are for example provided by embedded nuts, similar to the first screwed hole portions 34b. The second screwed hole portions 35b define axes extending in the longitudinal direction of the cooling water tubes 11, e.g., in the vehicle right and left direction.

Namely, the axes of the second screwed hole portions 35b are perpendicular to the axes of the first screwed hole portions 34b. Accordingly, the first screwed hole portions 34b and the second screwed hole portions 35b are disposed such that the axes thereof are nonparallel.

The radiator 2 has side plates 39 at both sides of the core part 33 for reinforcing the core part 33. The side plates 39 extends in the longitudinal direction of the cooling water tubes 31. A first side plate 39, which is disposed at the upper side of the core part 33, is provided with two fixing brackets 40 for fixing the radiator 2 to the engine radiator 3.

Although not illustrated, upper and lower ends of the first cooling water header tank 34a and the second cooling water header tank 35a are covered with tank caps. The preceding parts constructing the radiator 2 are for example made of aluminum alloy and integrated by brazing, similar to the condenser 1.

The condenser 1 and the radiator 2 are integrated by fastening the bolts 41 passing through the first bracket 20 with the first screwed hole portions 34b and fastening the bolts 42 through the second bracket 25 with the second screwed hole portions 35b. As such, the integrated heat exchanger is produced.

The integrated heat exchanger is mounted to the vehicle, as shown in FIG. 2. With the operation of the electric fan 7, air is sucked in the engine compartment through the radiator grill 5 and flows through the condenser 1 and the radiator 2.

At this time, the condenser 1 performs heat exchange between the air and the high temperature, high pressure refrigerant discharged from the compressor, thereby condensing the refrigerant. Also, the radiator 2 performs heat exchange between the air and the cooling water, which has been heated by the electric components, thereby to cool the cooling water.

Next, a process of manufacturing the integrated heat exchanger will be described. The condenser 1 and the radiator 2 are separately formed and then integrated with each other as described above.

The condenser 1 and the radiator 2 are separately formed because of the following reason. Because the condenser 1 and the radiator 2 have different in structures and size, the amounts of deformation due to a change of heat during the brazing are different between the condenser 1 and the radiator 2. If the condenser 1 and the radiator 2 are brazed in a condition being preliminary integrated using the same jig, the condenser 1 and the radiator 2 will be abnormally deformed. This results in leakages of the refrigerant and the cooling water.

In the process of manufacturing the condenser 1, first, the refrigerant tubes 11, the fins 12, the first refrigerant header tank 14a and the second refrigerant header tank 15a are assembled. For example, the longitudinal ends of the refrigerant tubes 11 are inserted to the slits of the first refrigerant header tank 14a and the second refrigerant header tank 15a, and the fins 12 are interposed between the refrigerant tubes 11.

Next, the side plate 21 is placed on the uppermost refrigerant tube 11 through the fin 12. Also, the other side plate 21 is placed under the lowermost refrigerant tube 11 through the fin 12. In this condition, the core part 13 is tied with a wire in the up and down direction. As such, the core part 13 is preliminarily fixed.

Further, the plate 19 is preliminarily fixed to the first refrigerant header tank 14a such as by crimping. At this time, the plate 19 is located such that the though holes 19a, 19b correspond to communication holes of the first refrigerant header tank 14a, which have been formed beforehand. Further, the gas-liquid separator 18, to which the first bracket 20 has been preliminarily fixed, is preliminarily fixed to the first refrigerant header tank 14a through the fixing member 18a. Also, the first separator 14b is preliminarily fixed at a predetermined position in the first refrigerant header tank 14a.

Likewise, the refrigerant inlet pipe 16 and the refrigerant outlet pipe 17 are preliminarily fixed to communication holes of the second refrigerant header tank 15a, which have been formed beforehand, such as by crimping. Also, the second separator 15b is preliminarily fixed at a predetermined position in the second refrigerant header tank 15a. Further, the brackets 22 are preliminarily fixed to the lower side plate 21 such as by crimping.

The above preliminarily fixed parts are fixed not to be displaced by using a specific jig in the right and left direction. Further, the tank caps 23 are preliminarily fixed to the lower end upper ends of the first refrigerant header tank 14a and the lower end of the second refrigerant header tank 15a such as by crimping. The tank cap 24 with the second bracket 25 is preliminarily fixed to the upper end of the second refrigerant header tank 15a such as by crimping.

Then, the condenser 1 as preliminarily fixed above is heated to approximately 600 degrees Celsius by heating means, so a brazing material that had been applied on surfaces of the respective parts beforehand is melted. The above condenser is cooled until the brazing material is hardened again. As such, the constituent parts are integrally brazed. Accordingly, the condenser 1 is produced.

In the process of manufacturing the radiator 2, first the cooling water tubes 31, the fins 32, the first cooling water header tank 34a, and the second cooling water header tank 35a are assembled, similar to the condenser 1. Specifically, the longitudinal ends of the cooling water tubes 31 are inserted to the slits of the first and second cooling water header tanks 34a, 35a. Also, the fins 32 are interposed between the cooling water tubes 31.

Further, the upper side plate 39 is placed on the uppermost cooling water tube 31 through the fin 32. Also, the lower side plate 39 is placed under the lowermost cooling water tube 31 through the fin 32. Then, the assembled core part 33 is tied by a wire not to displace in the up and down direction, similar to the condenser 1.

The cooling water inlet pipe 36 is preliminarily coupled to a communication hole of the second cooling water header tank 35a, which has been formed beforehand, such as by crimping. Also, the cooling water outlet pipe 37 and the air bleeding valve 38 are preliminarily coupled to communication holes that have been formed on the first cooling water header tank 34a beforehand such as by crimping.

Further, as described above, the nuts are embedded in the through holes of the first and second cooling water header tanks 34a, 35a by press-fitting. Thus, the nuts are preliminarily fixed to the first and second cooling water header tanks 34a, 35a. Also, the brackets 40 are preliminarily fixed to the upper side plate 39 such as by crimping. In this condition, the preliminarily assembled radiator 2 is fixed by a specific jig in the right and left direction not to be displaced.

Further, the tank caps are preliminarily fixed to the upper and lower ends of the first and second cooling water header tanks 34a, 35a. Thereafter, the preliminarily assembled radiator 2 is integrally brazed in the similar manner to the condenser 1. Accordingly, the radiator 2 is produced.

Next, the condenser 1 and the radiator 2 produced as above are integrated. Specifically, the bolts 41 are fastened to the first screwed hole portions 34b of the first cooling water header tank 34a through the through holes 20a of the first bracket 20, and the bolts 42 are fastened to the second screwed hole portions 35b of the second cooling water header tank 35a through the through holes 25c of the second bracket 25. Accordingly, the integrated heat exchanger is produced.

In the above integrated heat exchanger, the axes of the first screwed hole portions 34b and the axes of the second screwed hole portions 35b are disposed perpendicular to each other. As such, the axes of the bolts 41 received in the first screwed hole portions 34b and the axes of the bolts 42 received in the second screwed hole portions 35b are perpendicular to each other.

Therefore, even if the integrated heat exchanger is subjected to vibrations in the direction parallel to the axes of the bolts 41, loads caused by the vibrations are received not only by the bearing surfaces of the bolts 41 but also by the shaft portions of the bolts 42. Therefore, deformation of the bearing surface of the bolts 41 is reduced. Also, loosening of the bolts 41 is reduced. Likewise, even if the integrated heat exchanger is subjected to vibrations in the direction parallel to the axes of the bolts 42, deformation of the bearing surfaces of the bolts 42 is reduced. Also, loosening of the bolts 42 is reduced.

Accordingly, the plural heat exchangers 1, 2 are securely connected without causing the deformations and loosening of the bolts 41, 42.

In an integrated heat exchanger in which a first heat exchanger and a second heat exchanger are connected through side plates thereof using bolts and nuts, it may be possible to change the shape of the side plates such that shaft portions of the bolts are disposed nonparallel. In this case, however, strength of the side plates will be reduced. As a result, it is difficult to sufficiently reinforce core parts of the first and second heat exchangers. Further, mechanical strength of the first and second heat exchangers will be reduced.

In the embodiment, on the other hand, the first bracket 20 is disposed to the gas-liquid separator 18 having high rigidity and the second bracket 25 is disposed to the second refrigerant header tank 15a of the refrigerant header part 15 having high rigidity. Therefore, even when the first bracket 20 and the second bracket 25 are disposed on the condenser 1, mechanical strength of the condenser 1 will not be reduced.

Further, the first screwed hole portions 34b and the second screwed hole portions 35b are formed on the first and second cooling water header tanks 34a, 35a of the cooling water header parts 34, 35 having high rigidity. Therefore, even when the first screwed portions 34b and the second screwed portions 35b are formed on the radiator 2, mechanical strength of the radiator 2 will not be reduced.

Further, the first and second screwed hole portions 34a, 35a are provided by the embedded nuts. Therefore, the axes of the first and second screwed hole portions 34a, 35a can be set to desired directions, respectively. Accordingly, the directions of the shaft portions of the bolts 41, 42 can be easily changed to desired directions without reducing the strength of the condenser 1 and the radiator 2.

Furthermore, the first bracket 20 is disposed on the portion of the gas-liquid separator 18, which is located higher than the upper end wall of the condensing section 13*a*. Therefore, the fastening positions of the bolts 41, i.e., the positions of the first screwed hole portions 34*b* can be shifted in the longitudinal direction of the gas-liquid separator 18 with respect to the fastening positions of the bolts 42, i.e., the positions of the second screwed hole portions 35*b*.

Therefore, the fastening positions of the bolts 41 can be arranged such that a line connecting the fastening positions of the bolts 41 of the first bracket 20 and the fastening positions of the bolts 42 of the second bracket 25 defines a predetermined angle relative to a direction parallel to the longitudinal direction of the cooling water tubes 31. As such, even if a load is applied to the integrated heat exchanger, the load can be received not only by fastening portions of the bolts 41, 42 but also by the cooling water tubes 31, which intersect the line with the predetermined angle. Accordingly, deformation and breakage of the integrated heat exchanger are reduced.

Figure 5:
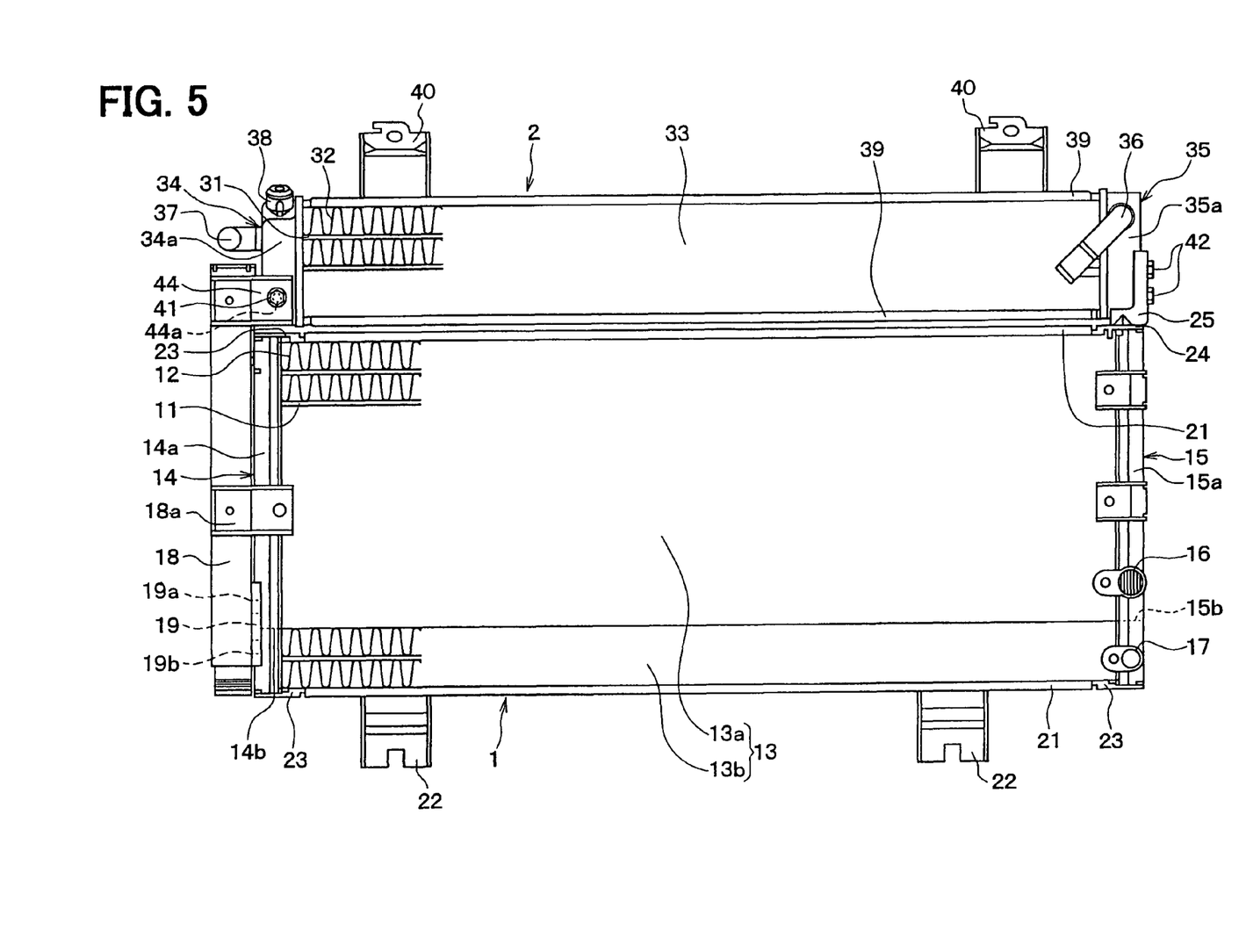
FIG. 5 is a schematic front view of an integrated heat exchanger according to a second embodiment of the present invention.

A second embodiment of the present invention will be described hereafter with reference to FIG. 5. As shown in FIG. 5, a first bracket 44 having one through hole 44*a* is employed in place of the first bracket 20 of the first embodiment. With this, the first cooling water header tank 34*a* has one first screwed hole portion 34*b* at a position corresponding to the through hole 44*a* of the first bracket 44.

Thus, one bolt 41 is used to connect the first bracket 44 to the first cooling water header tank 34*a*. Structures other than the number of the bolt 41 and the first screwed hole portion 34*b* are the same as those of the first embodiment. Also, the integrated heat exchanger of the second embodiment is manufactured in the manner similar to the integrated heat exchanger of the first embodiment.

Also in the integrated heat exchanger of the second embodiment, advantageous effects similar to those of the first embodiment can be provided by adjusting the diameter and a fastening force of the bolt 41. Therefore, the condenser 1 and the radiator 2 can be securely connected by the bolts 41, 42 that are disposed nonparallel, without reducing strength thereof. Further, because the number of the bolts 41 is reduced and the size of the second bracket 44 is reduced, the weight of the integrated heat exchanger can be reduced.

Figure 6:
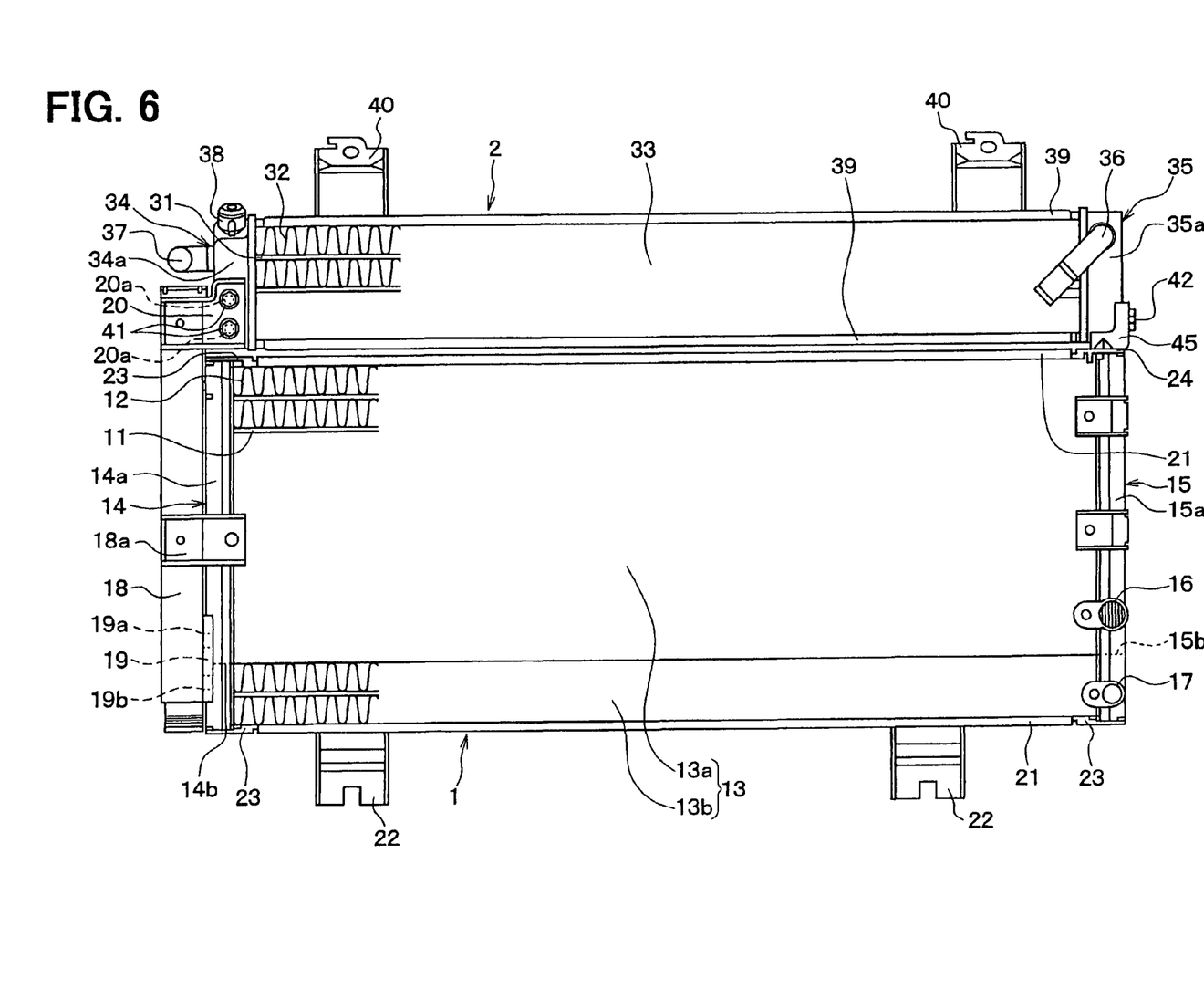
FIG. 6 is a schematic front view of an integrated heat exchanger according to a third embodiment of the present invention.

A third embodiment of the present invention will be described with reference to FIG. 6. As shown in FIG. 6, a second bracket 45 having one through hole for the bolt is employed in place of the second bracket 25 of the first embodiment. With this, the second cooling water header tank 35*a* has one second screwed hole portion 35*b* at a position corresponding to the through hole of the second bracket 45.

Further, one bolt 42 is used to connect the second bracket 45 to the second cooling water header tank 35*a*. Structures other than the number of the bolt 42 and the screwed hole portion 35*b* are the same as those of the integrated heat exchanger of the first embodiment. Also, the integrated heat exchanger of the third embodiment can be manufactured in the similar manner as that of the first embodiment.

Also in the heat exchanger of the third embodiment, advantageous effects similar to those of the first embodiment can be provided by adjusting the diameter and the fastening force of the bolt 42. As such, the condenser 1 and the radiator 2 can be securely connected by the bolts 41, 42 that are disposed nonparallel, without reducing the strength thereof.

Further, the number of the bolt 42 is reduced and the size of the second bracket 42 is reduced. Therefore, the weight of the integrated heat exchanger can be reduced.

The above first to third embodiments can be further modified as follows.

(1) The first bracket 44 of the second embodiment and the second bracket 46 of the third embodiment can be employed together. Namely, the first bracket can be fixed to the first cooling water header tank with one bolt 41 and the second bracket can be fixed to the second cooling water header tank with one bolt 42. Also in this construction, advantageous effects similar to the second and third embodiments can be provided.

(2) In the above embodiments, the first and second brackets 20, 25, 44, 45 and the first and second screwed hole portions 34*b*, 35*b* are used for connecting the condenser 1 and the radiator 2. Alternatively, the first and second brackets 20, 25, 44, 45 and the first and second screwed hole portions 34*b*, 35*b* can be used for connecting the condenser 1 and the radiator 2 directly to other parts or a vehicle body. Namely, the condenser 1 and the radiator 2 can be separately connected to other parts or the vehicle body through the first and second brackets 20, 25, 44, 45 and the first and second screwed hole portions 34*b*, 35*b*.

Also in this case, the condenser 1 and the radiator 2 can be securely connected to the separate parts by the bolts disposed nonparallel, without reducing the strength thereof. Further, this connecting method can not be limited to connect the condenser 1 and the radiator 2, but can be applied to other heat exchangers.

(3) In the above embodiments, the condenser 1 is a sub-cool type condenser having the super-cooling section 13*b* for super-cooling the liquid-phase refrigerant. However, the condenser 1 can be a condenser without having the super-cooling section 13*b* and the gas-liquid separator 18. In this case, the first bracket 20 is disposed on the first refrigerant header tank 14*a* through the tank cap 24, similar to the second bracket 25.

(4) In the above embodiments, the axes of the first screwed portions 34*b* are disposed in the direction perpendicular to the longitudinal direction of the cooling water tubes 31, e.g., in the right and left direction of the vehicle, and the axes of the second screwed portions 35*b* are disposed in the direction parallel to the longitudinal direction of the cooling water tubes 31, e.g., in the vehicle front and rear direction. However, the directions of the axes of the first and second screwed hole portions 34*b*, 35*b* are not limited to the above. Because vibration conditions are changed in accordance with the mounting position or condition of the integrated heat exchanger or the respective heat exchangers, the directions of the axes of the first and second screwed hole portions 34*b*, 35*b* can be changed in view of the mounting position and conditions.

In any cases, the axes of the first screwed hole portions 34*b* and the axes of the second screwed hole portions 35*b* are disposed nonparallel such that the fastening directions of the bolts 41 and the fastening directions of the bolts 42 are nonparallel. Here, nonparallel relationship is not limited to the perpendicular relationship.

In other words, the axis of each first screwed hole portion 34*b* and the axis of each second screwed hole portion 35*b* are disposed at a positive angle relative to each other when projected on a plane. For example, the axis of the first screwed hole portion 34*b* and the axis of the second screwed hole portion 35*b* are perpendicular to each other or intersect each other.

(5) In the above embodiments, the condenser 1 and the radiator 2 are integrated into the integrated heat exchanger. However, combinations of the heat exchangers are not limited to the combination of the condenser 1 and the radiator 2. For example, the condenser 1 and an oil cooler for cooling oil can be integrated into the integrated heat exchanger.

(6) In the above embodiments, the condenser 1 is integrally brazed after the constituent components such as the refrigerant inlet pipe 16 and the refrigerant outlet pipe 17 are preliminarily fixed. However, the constituent components are not limited to the components described in the above. The constituent components may be different depending on the type of heat exchanger and its use. Any necessary constituent components can be preliminarily fixed such as by crimping and then integrated by brazing.

(7) In the above embodiments, the present invention is applied to the heat exchangers for the vehicle. However, use of the present invention is not limited to the heat exchangers for the vehicle, but can be applied to other heat exchangers within the import of the present invention.

The exemplary embodiments of the present invention are described above. However, the present invention is not limited to the above embodiments, but may be implemented in other ways without departing from the spirit of the invention.

What is claimed is:

1. An integrated heat exchanger comprising:
    a first heat exchanger having a first heat exchanging part and a pair of first header parts, the first heat exchanging part including a plurality of first tubes through which a first fluid flows, the pair of first header parts disposed at ends of the first tubes and in communication with the first tubes; and
    a second heat exchanger having a second heat exchanging part and a pair of second header parts, the second heat exchanging part including a plurality of second tubes through which a second fluid flows, the pair of second header part disposed at ends of the second tubes and in communication with the second tubes, wherein the second heat exchanger and the first heat exchanger are disposed in parallel to each other with respect to a flow of a third fluid that flows outside of the first heat exchanger and the second heat exchanger, a surface of the first heat exchanger through which the third fluid flows and a surface of the second heat exchanger through which the third fluid flows being disposed on a common plane, the integrated heat exchanger further comprising:
    a first single piece bracket disposed on one of the first header parts;
    a second single piece bracket disposed on the other of the first header parts;
    a first bolt-receiving portion disposed on one of the second header parts and defining at least one hole that defines a first axis;
    a second bolt-receiving portion disposed on the other of the second header parts and defining at least one hole that defines a second axis;
    a first bolt extending through the first single piece bracket and received in the hole of the first bolt-receiving portion; and
    a second bolt extending through the second single piece bracket and received in the hole of the second bolt-receiving portion, thereby to integrate the first heat exchanger and the second heat exchanger, wherein
    the second heat exchanger is disposed adjacent the first heat exchanger in an alignment direction; and
    the first axis and the second axis are disposed nonparallel to each other and non-parallel to the alignment direction of the first and second heat exchangers.

2. The integrated heat exchanger according to claim 1, wherein
    one of the first header parts has a header tank connected to the first tubes and a gas-liquid separator for separating the first fluid into a gas-phase fluid and a liquid-phase fluid, and
    the first single piece bracket is disposed on the gas-liquid separator.

3. The integrated heat exchanger according to claim 1, wherein
    the first axis and the second axis are disposed perpendicular to each other.

4. The integrated heat exchanger according to claim 1, wherein
    at least one of the first bolt-receiving portion and the second bolt-receiving portion defines a plurality of holes including the hole.

5. The integrated heat exchanger according to claim 1, wherein
    the first bolt-receiving portion has a screwed portion on a wall defining the hole, and
    the second bolt-receiving portion has a screwed portion on a wall defining the hole, and
    the first bolt and the second bolt are fastened with the screwed portions.

6. The integrated heat exchanger according to claim 5, wherein
    the screwed portions are provided by nuts that are embedded in the first and second bolt-receiving portions.

7. The integrated heat exchanger according to claim 1, wherein
    the first axis is substantially parallel to the flow of the third fluid, and
    the second axis is substantially parallel to a longitudinal direction of the first tubes and the second tubes.

8. The integrated heat exchanger according to claim 1, wherein
    the second single piece bracket includes a first wall portion connected to the first heat exchanger and a second wall portion to which the second heat exchanger is fixed, and
    the second wall portion extends substantially perpendicularly to the first wall portion on an outer surface of the first heat exchanger.

9. The integrated heat exchanger according to claim 1, wherein
    the first axis is substantially parallel to the flow of the third fluid, and
    the second axis is substantially parallel to the flow of the second fluid in the second tubes.

10. The integrated heat exchanger according to claim 1, wherein
    the first bolt-receiving portion and the second bolt-receiving portion are disposed adjacent to a boundary between the first heat exchanger and the second heat exchanger.

11. The integrated heat exchanger according to claim 1, wherein
    the first bolt-receiving portion is disposed to project inside of the one of the second header parts, and
    the second bolt-receiving portion is disposed to project inside of the other of the second header parts.

12. The integrated heat exchanger according to claim 1, wherein
    the first axis, the second axis and the alignment direction of the first and second heat exchangers are substantially perpendicular to one another.

13. An integrated heat exchanger comprising:
    a first heat exchanger having a first heat exchanging part and a pair of first header parts, the first heat exchanging part including a plurality of first tubes through which a first fluid flows, the pair of first header parts disposed at ends of the first tubes and in communication with the first tubes; and a second heat exchanger having a second heat exchanging part and a pair of second header parts, the second heat exchanging part including a plurality of second tubes through which a second fluid flows, the pair of second header parts disposed at ends of the second tubes and in communication with the second tubes, a first bracket attached to both one of the first header parts and one of the second header parts, and a second bracket attached to both the other of the first header parts and the other of the second header parts; wherein, the one of the first header parts is connected to the one of the second header parts by the first bracket and a first bolt defining a first axis, the other of the first header parts is connected to the other of the second header parts by the second bracket and a second bolt defining a second axis, the second heat exchanger is disposed adjacent the first heat exchanger in an alignment direction; and the first axis and the second axis are disposed nonparallel to each other and non-parallel to the alignment direction of the first and second heat exchangers.

14. The integrated heat exchanger according to claim 13, wherein
the first bracket resides over the boundary between the one of the first header parts and the one of the second header parts.

15. The integrated heat exchanger according to claim 13, wherein
the second bracket has a generally L-shape, and partially resides between the other of the first header parts and the other of the second header parts.

16. The integrated heat exchanger according to claim 13, wherein
the one of the first header parts has a header tank connected to the first tubes and a gas-liquid separator for separating the first fluid into a gas-phase fluid and a liquid-phase fluid, and
the first bracket is attached to the gas-liquid separator.

17. The integrated heat exchanger according to claim 13, wherein
the first axis and the second axis are disposed perpendicular to each other.

18. The integrated heat exchanger according to claim 13 further comprising:
a first bolt-receiving portion disposed on the one of the second header parts and defining at least one hole that extends along the first axis, and
a second bolt-receiving portion disposed on the other of the second header parts and defining at least one hole that extends along the second axis.

19. The integrated heat exchanger according to claim 18, wherein
at least one of the first bolt-receiving portion and the second bolt-receiving portion defines a plurality of holes.

20. The integrated heat exchanger according to claim 18, wherein
the first bolt-receiving portion has a threaded portion on a wall defining the hole, and
the second bolt-receiving portion has a threaded portion on a wall defining the hole, and
the first bolt and the second bolt are fastened with the threaded portions.

21. The integrated heat exchanger according to claim 20, wherein
the threaded portions are provided by nuts that are embedded in the first and second bolt-receiving portions.

22. The integrated heat exchanger according to claim 13, wherein
the one of the second header parts has a first bolt-receiving portion projecting inside of the one of the second header parts,
the other of the second header parts has a second bolt-receiving portion projecting inside of the other of the second header parts,
the first bolt is received in the first bolt-receiving portion through the first bracket, and
the second bolt is received in the second bolt-receiving portion through the second bracket.

23. The integrated heat exchanger according to claim 13, wherein
the first axis, the second axis and the alignment direction of the first and second heat exchangers are perpendicular to one another.

24. An integrated heat exchanger comprising:
a first heat exchanger having a first heat exchanging part and a pair of first header parts, the first heat exchanging part including a plurality of first tubes through which a first fluid flows, the pair of first header parts disposed at ends of the first tubes and in communication with the first tubes; and
a second heat exchanger having a second heat exchanging part and a pair of second header parts, the second heat exchanging part including a plurality of second tubes through which a second fluid flows, the pair of second header parts disposed at ends of the second tubes and in communication with the second tubes,
a first bracket attached to both one of the first header parts and one of the second header parts, and
a second bracket attached to both the other of the first header parts and the other of the second header parts; wherein,
the one of the first header parts is connected to the one of the second header parts by the first bracket and a first bolt defining a first axis,
the other of the first header parts is connected to the other of the second header parts by the second bracket and a second bolt defining a second axis, and
the first axis and the second axis are disposed nonparallel to each other; and
the other of the first header parts has a tank cap provided with the second bracket, and the second bracket has a connecting wall portion connected to the tank cap and a fixing wall portion to which the second heat exchanger is fixed via the second bolt, wherein the fixing wall portion extends substantially perpendicularly from the connecting wall portion.

* * * * *